United States Patent [19]

Ellington

[11] Patent Number: 4,852,661

[45] Date of Patent: Aug. 1, 1989

[54] PORTABLE CONCRETE HAMMER

[76] Inventor: David A. Ellington, 4271 Capital Ave., Grand Island, Nebr. 68803

[21] Appl. No.: 53,927

[22] Filed: May 26, 1987

[51] Int. Cl.[4] .......... B25D 9/00

[52] U.S. Cl. .......... 173/84; 173/89

[58] Field of Search .......... 173/22, 23, 25, 27, 173/39, 42, 90, 84, 89

[56] References Cited

U.S. PATENT DOCUMENTS

| | | | |
|---|---|---|---|
| 2,659,583 | 11/1953 | Dorkins | 173/27 X |
| 3,117,635 | 1/1964 | Deerkoski | 173/27 X |
| 3,189,104 | 6/1965 | Jamer et al. | 173/154 |
| 3,509,723 | 5/1970 | Dorn | 60/57 |
| 3,819,144 | 6/1974 | Hatlevoll et al. | 299/37 |
| 4,155,527 | 5/1979 | Sjöberg | 248/647 |

FOREIGN PATENT DOCUMENTS

| | | | |
|---|---|---|---|
| 612554 | 1/1961 | Canada | 173/25 |
| 1033434 | 6/1966 | United Kingdom | 173/25 |

*Primary Examiner*—Frank T. Yost
*Assistant Examiner*—Willmon Fridie, Jr.
*Attorney, Agent, or Firm*—Henderson & Sturm

[57] ABSTRACT

A portable concrete hammer including a wheeled carriage, a mast movable between a vertical operating position and a horizontal transport position, and an automatic ratchet drive that advances the concrete hammer over a concrete surface during the portion of the operating cycle when the weight is being raised.

14 Claims, 2 Drawing Sheets

PORTABLE CONCRETE HAMMER

TECHNICAL FIELD

This invention relates to construction equipment and more particularly to a machine for breaking concrete.

BACKGROUND ART

Numerous devices are used in the construction industry to break concrete. Some devices such as the pneumatic jack hammer are useful for small projects, but they require the input of strenuous labor. Other devices are used on large projects such as highway construction, but they are not adaptable to small projects or interior work due to their cumbersome bulk and complicated structure.

Those concerned with these and other problems recognize the need for an improved portable concrete hammer.

DISCLOSURE OF THE INVENTION

The present invention provides a portable concrete hammer including a wheeled carriage, a mast movable between a vertical operating position and a horizontal transport position, and an automatic ratchet drive that advances the concrete hammer over a concrete surface during the portion of the operating cycle when the weight is being raised.

The concrete hammer includes an electric motor or a gasoline engine which powers a hydraulic pump operably coupled to a hydraulic cylinder. The weight is lifted by the hydraulic cylinder through a system of pulleys and a cable. The concrete hammer is compactly designed so that it can pass through small doorways and be used for interior work. Further, the concrete hammer can be assembled, operated and disassembled by a single operator.

An object of the present invention is the provision of an improved portable concrete hammer.

Another object is to provide a concrete hammer that is suitable for use on interior projects.

A further object of the invention is the provision of a concrete hammer that can be easily operable by a single operator.

Still another object is to provide a concrete hammer that is easy to use and maintain.

A still further object of the present invention is the provision of a concrete hammer that is simple in structure and inexpensive to manufacture.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figures 1, 2:
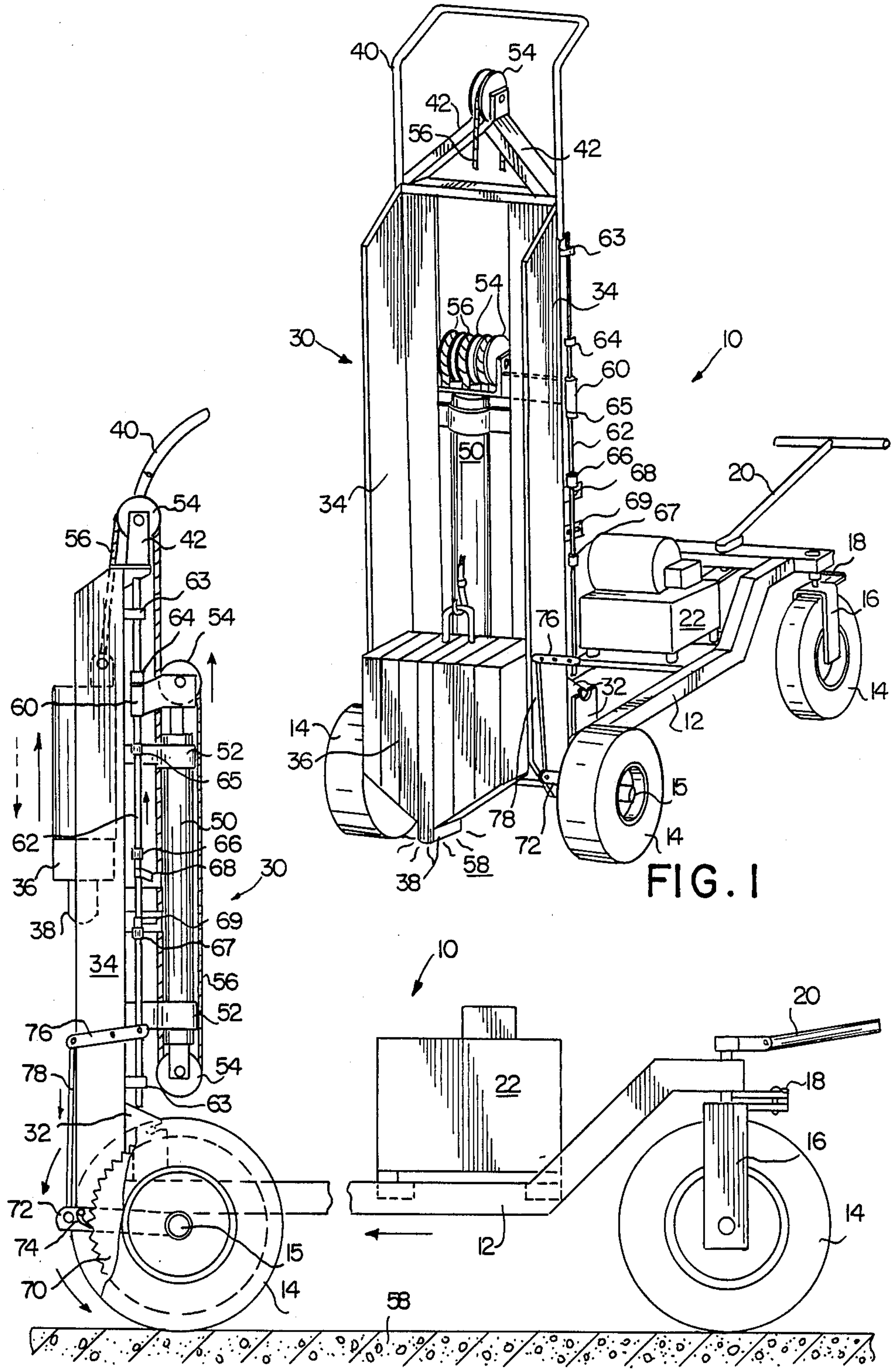
FIG. 1 is a perspective view of the portable concrete hammer of the present invention.
FIG. 2 is a side elevational view of the concrete hammer having a portion cut away to show the ratchet drive, and illustrating the extension of the hydraulic cylinder to lift the weight to a predetermined elevation.
Figure 3:
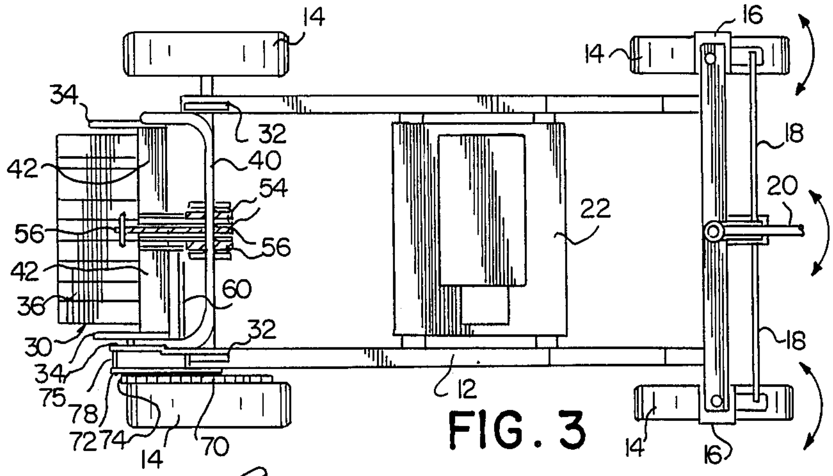
FIG. 3 is a top plan view taken along line 3—3 of FIG. 1 illustrating the steering of the hammer by movement of the steering bar (cut away)

Referring now to the drawings, wherein like reference numerals designate identical or corresponding parts throughout the several views, FIG. 1 shows the portable concrete hammer (10) of the present invention. The concrete hammer (10) includes a frame (12) supported by ground wheels (14). The wheels (14) at the rear of the frame (12) are supported in pivotable yokes (16) and are connected by tie rods (18) to a steering bar (20). The rear of the frame (12) also supports a selectively removable hydraulic pump (22) powered by an electric motor or gasoline engine.

Figure 7:
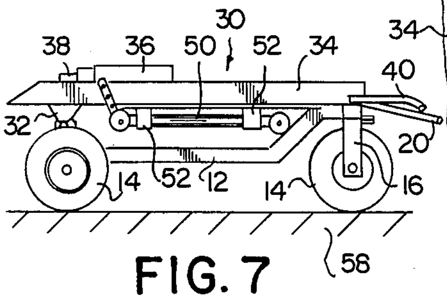
FIG. 7 is a reduced side elevational view showing the motor or engine removed from the frame and the mast moved to the horizontal transport position.

A mast (30) is pivotally attached to the frame (12) by mounts (32) and is movable between a vertical operating position and a horizontal transport position (FIG. 7). The mast (30) includes oppositely directed guides (34) that slidably receive a weight (36). The mast of the weight (36) can be varied to suit a particular job and generally would be in the range of 200 Kilograms. The lower portion of the weight (36) supports a chisel (38) that may be selectively directed with or transverse to the direction of travel of the concrete hammer (10). The upper section of the mast (30) carries a gripping bar (40) and a pulley bracket (42).

Figure 4:
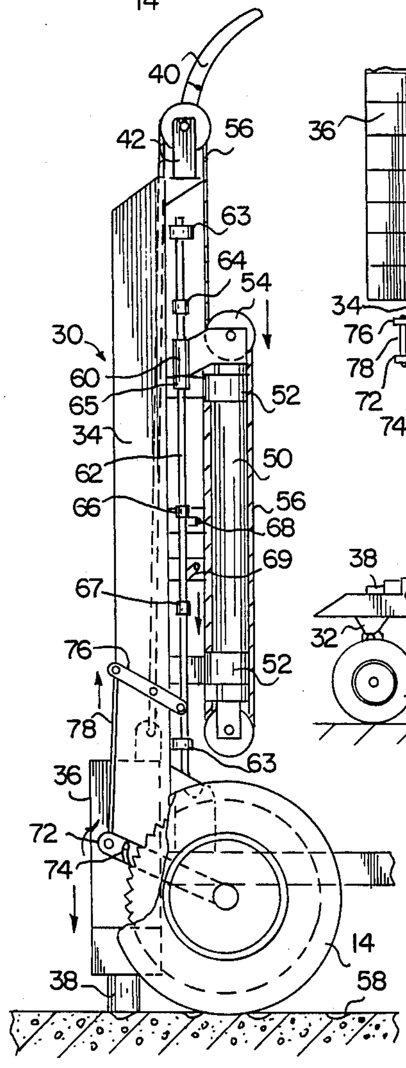
FIG. 4 is a side elevational view similar to FIG. 2, but illustrating the retraction of the hydraulic cylinder to allow the weight to drop by gravity to impact the concrete surface.

As best shown in FIGS. 2 and 4, a hydraulic cylinder (50) is supported at the rear of the mast (30) by cylinder mounts (52). The hydraulic cylinder (50) is connected to the weight (36) by a system of pulleys (54) and a cable (56). It is to be understood that the number and orientation of the pulleys (54) can be modified to achieve any desired mechanical advantage. The cylinder (50) is operably coupled to the hydraulic pump (22) by quick connect fittings (not shown). Lifting of the weight (36) is accomplished by extending the cylinders (50) (FIG. 2) while retracting the cylinder (50) (FIG. 4) allows the weight (36) to fall by gravity to impact the concrete surface (58).

Figure 5:
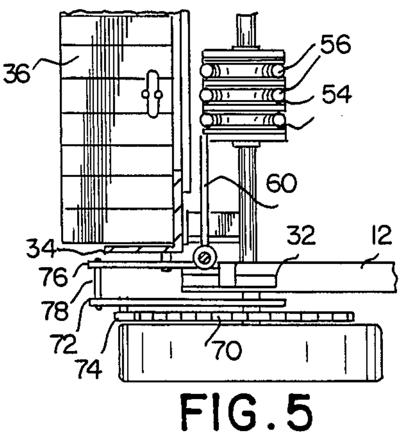
FIG. 5 is a top plan sectional view taken along line 5—5 of FIG. 4 showing the bracket extending from the hydraulic cylinder to the linkage rod attached to one side of the mast.
Figure 6:
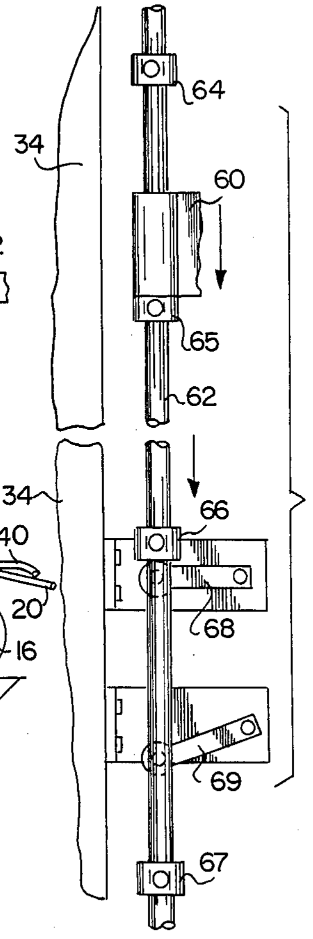
FIG. 6 is an enlarged side elevational sectional view taken along line 6—6 of FIG. 5 showing the linkage rod and the adjustable drive stop used to vary the distance of the ratchet advance, and showing the adjustable switch stops used to control the cycling of the hydraulic cylinder to vary the elevation of the weight.

Referring now to FIGS. 4–6, a bracket (60) is attached to the cylinder (50) and extends laterally toward one of the mast guides (34). A linkage rod (62) is slidably attached to and aligned with the guide (34) by sleeves (63). The bracket (60) encircles the rod (62) and moves the rod (62) upwardly when it contacts the adjustable drive stop (64), and downwardly when it contacts the adjustable reset stop (65). Adjustable switch stops (66 and 67) are attached to the rod (62) and contact microswitches (68 and 69) to control the cycle of the extension and retraction of the cylinder (50).

As most clearly shown in FIGS. 2, 4 and 5, a toothed wheel (70) is attached to one of the ground wheels (14) and a ratchet bar (72) is pivotally attached to and extends outwardly from the wheel axle (15). The ratchet bar (72) supports a pawl (74) which is biased to engage the toothed wheel (70). The linkage rod (62) and the ratchet bar (72) are interconnected by a reversing strap (76) pivotally attached to the mast guide (34) and a reversing rod (78) pivotally attached to one end of the reversing strap (76). Upward movement of the linkage rod (62) is thus translated into downward movement of the ratchet bar (72) which in turn rotates the ground wheel (14) to advance the concrete hammer (10) over the concrete surface (58).

In operation, the portable concrete hammer (10) is transported to the job site, the mast (30) is moved to and secured in the vertical operating position, the hydraulic pump (22) is mounted on the frame (12), and the hydraulic cylinder (50) is operably connected to the pump (22) by quick connect hydraulic couplers. The drive stop (64) is selectively positioned on and secured to the linkage rod (62) so that the ratchet drive will advance the concrete hammer (10) the desired distance with each stroke. The reset stop (65) and the switch stops (66 and 67) are also positioned on and secured to the linkage rod (62) so that the stroke of the cylinder (50) will be controlled to lift the weight (36) to the desired elevation. The steering bar (20) is positioned to direct the concrete hammer (10) along the desired path and the pump (22) is activated.

As the cylinder (50) is extended (FIG. 2), the weight (36) is lifted to the desired elevation by the system of pulleys (54) and the cable (56). Simultaneously, the bracket (60) contacts the drive stop (64) to lift the linkage rod (62) which depresses the ratchet bar (72) to advance the concrete hammer (10) while the weight (36) is being lifted. When the switch stop (67) contacts the microswitch (69), the cylinder (50) is retracted thereby allowing the weight (36) to drop by gravity to impact the concrete surface (58).

As the cylinder (50) is retracted (FIGS. 4 and 6), the bracket (60) contacts the reset stop (65) and lowers the linkage rod (62) which raises the ratchet bar (72) so that the biased pawl (74) engages the toothed wheel (70) at a new position. When the linkage rod (62) is lowered to the position where the switch stop (66) contacts the microswitch (68), the cylinder (50) is extended completing the cycle. The portable concrete hammer (10) thereby automatically cycles while advancing over the concrete surface (58).

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A self propelled portable concrete hammer, comprising:
- a frame supported by ground wheels;
- a mast attached to said frame:
- A weight adapted to slideably engage said mast;
- means for selectively lifting said weight to a predetermined elevation and allowing said weight to drop by gravity to impact a concrete surface; and
- a drive attached to and interconnecting said selective lifting means and one of said ground wheels, said drive being operable to advance said concrete hammer over the concrete surface while said weight is being raised ; wherein, the drive will automatically engage one of said ground wheels as the weight is being raised and will automatically disengage from said one of said ground wheels as the weight falls; and, wherein the incremental distance traveled by the concrete hammer is operatively associated with the raising of the weight relative to the mast.

2. The concrete hammer of claim 1 wherein said selective lifting means includes:
- a hydraulic cylinder attached to said mast;
- a cable interconnecting said hydraulic cylinder and said weight; and
- a switch operably connected to said hydraulic cylinder, said switch being activated by the position of said hydraulic cylinder to selectively extend and retract said hydraulic cylinder.

3. The concrete hammer of claim 1 wherein said selective lifting means is adjustable such that the elevation of the weight is variable.

4. The concrete hammer of claim 2 wherein said selective lifting means is adjustable such that the elevation of the weight is variable.

5. The concrete hammer of claim 1 wherein said drive is a ratchet drive.

6. The concrete hammer of claim 2 wherein said drive is a ratchet drive including a toothed wheel attached to one of said ground wheels and a mechanical linkage interconnecting said hydraulic cylinder and said toothed wheel, said linkage including a pawl biased to engage said toothed wheel to rotate said ground wheel and advance said concrete hammer when said hydraulic cylinder is moved to raise the weight.

7. The concrete hammer of claim 6 wherein said mechanical linkage further includes:
- a bracket attached to said hydraulic cylinder and extending to one side of said mast, said bracket being movable with the hydraulic cylinder as it is extended and retracted;
- a linkage rod slidably atatched to one side of said mast, said rod being contacted by and movable by said bracket;
- a ratchet bar having one end pivotally attached to said frame to support said biased pawl in engagement with said toothed wheel, and having the other end attached to said linakge rod, whereby movement of said hydraulic cylinder to raise the weight acts to rotate the ground wheel and advance the concrete hammer over the concrete surface.

8. The concrete hammer of claim 7 wherein said linkage rod and said ratchet bar are interconnected by a reversing strap pivotally attached to said mast and a reversing rod pivotally attached to one end of said reversing strap, whereby upward movement of said hydraulic cylinder to raise the weight is translated to downward movement of the ratchet bar to rotate the ground wheel and advance the concrete hammer over the concrete surface.

9. The concrete hammer of claim 1 wherein said drive is adjustable such that the distance of the advance of said concrete hammer is variable.

10. The concrete hammer of claim 5 wherein said drive is adjustable such that the distance of the advance of said concrete hammer is variable.

11. The concrete hammer of claim 6 wherein said drive is adjustable such that the distance of the advance of said concrete hammer is variable.

12. The concrete hammer of claim 7 wherein said drive is adjustable such that the distance of the advance of said concrete hammer is variable.

13. The concrete hammer of claim 8 wherein said drive is adjustable such that the distance of the advance of said concrete hammer is variable.

14. The concrete hammer of claim 12 wherein an adjustable drive stop is slidably attached to said linkage rod, said drive stop being disposed to contact said bracket when said hydraulic cylinder is moved to raise the weight.

* * * * *